United States Patent [19]

Cederwall et al.

[11] Patent Number: 4,635,332

[45] Date of Patent: Jan. 13, 1987

[54] SEALED TELESCOPIC JOINT AND METHOD OF ASSEMBLY

[75] Inventors: Philip J. Cederwall; Boris Glezer, both of San Diego, Calif.

[73] Assignee: Solar Turbines Incorporated, San Diego, Calif.

[21] Appl. No.: 775,879

[22] Filed: Sep. 13, 1985

[51] Int. Cl.$^4$ ............... B23P 15/00; B21D 39/00; F04D 31/00

[52] U.S. Cl. ................... 29/156.8 R; 29/428; 29/526 R; 415/115; 415/116; 415/139; 277/9.5; 277/11; 277/215

[58] Field of Search ............... 29/156.8 R, 400 C, 407, 29/157 R, 428, 526 R; 415/115, 116, 117, 134, 139; 277/9.5, 11, 215

[56] References Cited

U.S. PATENT DOCUMENTS

| | | | |
|---|---|---|---|
| 3,864,056 | 2/1975 | Gabriel et al. | 415/178 |
| 3,970,319 | 7/1976 | Carroll et al. | 277/215 |
| 4,030,288 | 6/1977 | Davis et al. | 60/39.16 R |
| 4,166,878 | 9/1979 | Thompson et al. | 428/256 |
| 4,268,046 | 5/1981 | Nisper | 277/139 |

FOREIGN PATENT DOCUMENTS

| | | | |
|---|---|---|---|
| 446821 | 12/1912 | France | 277/27 |
| WO82/01033 | 4/1982 | PCT Int'l Appl. | |

OTHER PUBLICATIONS

Service Manual for Caterpillar D397 and G397 Engines by Caterpillar Tractor Co.—Excerpts: Group 10, p. 1 issued Aug. 1962; Group 60, p. 8 issued Aug. 1957; Group 340.1, pp. 1–3 issued Aug. 1958.

Catalog No. SENS5500, Toll Guide for Caterpillar Dealers, by Caterpillar Tractor Co.—Published Nov. 1983—Excerpt: Section 5, p. 17.

G. L. Padgett, An Overview of the Centaur Type H Gas Turbine, Turbomachinery Technology Seminar, Coronado, Calif.—Mar. 11–14, 1984.

G. L. Padgett and W. W. Davis—Development of the Centaur Type H Gas Turbine Engine, ASME Paper No. 85-GT-214, Gas Turbine Conference and Exhibit—Houston, Texas—Mar. 18–21, 1985.

Primary Examiner—Howard N. Goldberg
Assistant Examiner—Ronald S. Wallace
Attorney, Agent, or Firm—Anthony N. Woloch

[57] ABSTRACT

A radially-resilient seal can frequently pop out its annular groove defined in a carrier when the carrier and an overlapping housing are telescopically assembled. Such misorientation of the seal prevents proper seating of the seal against the housing and ultimately permits leakage of pressurized fluid past the seal.

The present invention provides a compact sealed joint and fool-proof method of assembly which maintains proper orientation of a radially-resilient seal during telescopic assembly of a carrier and a housing. The sealed joint includes an annnular member having a diametrically tapered internal surface. The annular member positively ensures that the seal will properly seat against a housing inner surface which is not only physically inaccessible to the assembler but is also hidden from the assembler's view by an outer casing during the telescopic assembly.

11 Claims, 15 Drawing Figures

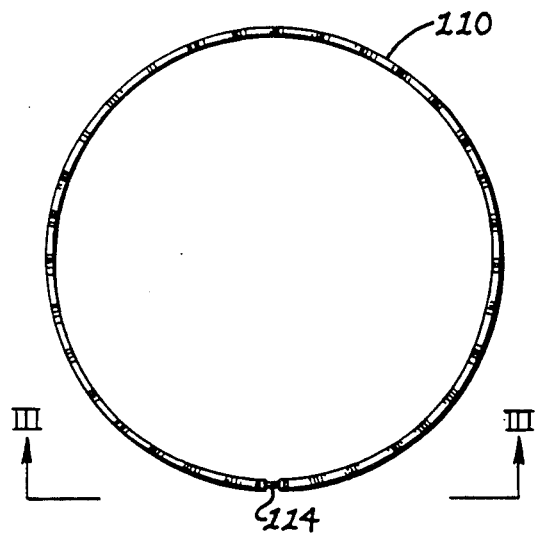
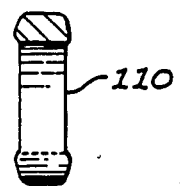
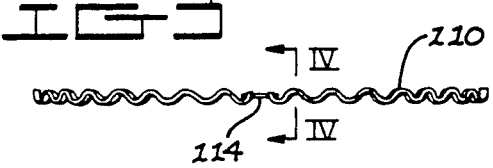
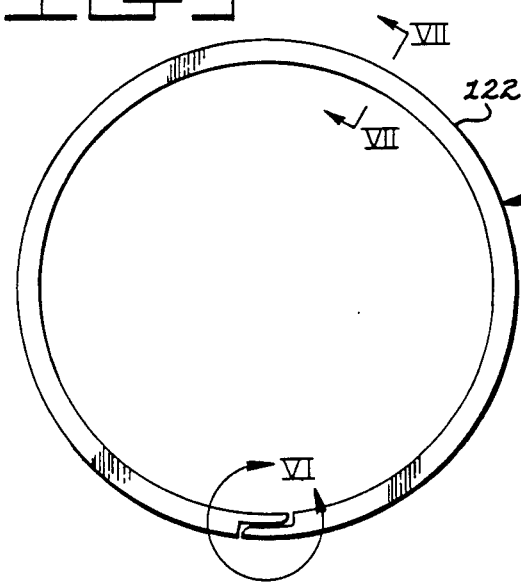
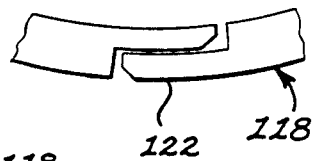
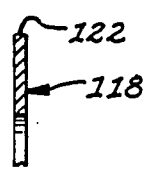

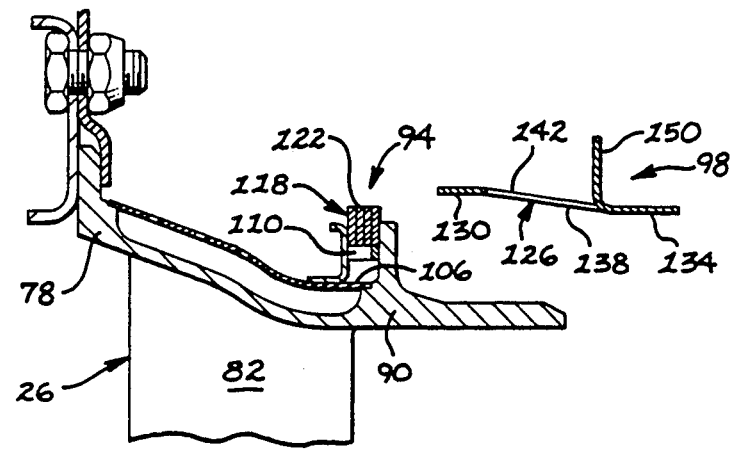
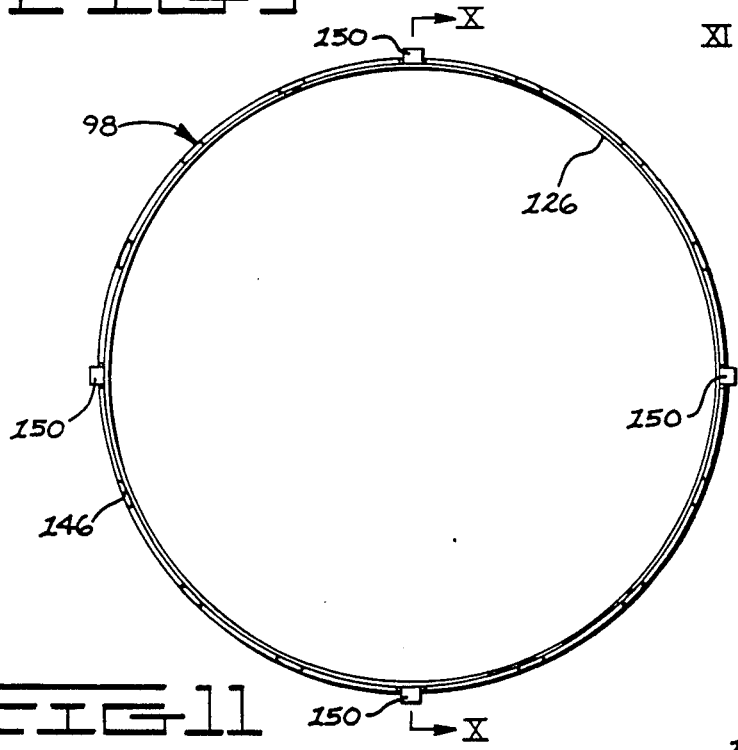
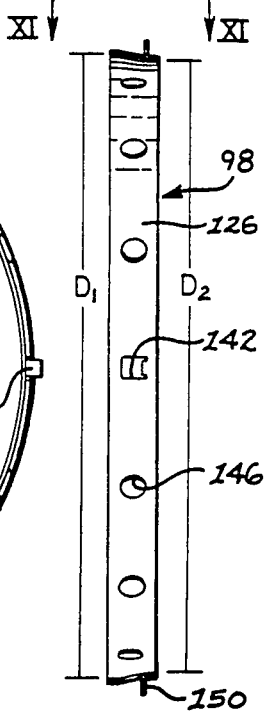
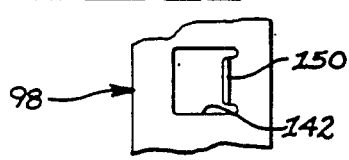
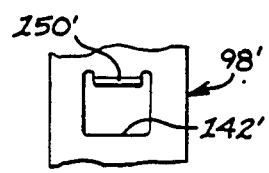

SEALED TELESCOPIC JOINT AND METHOD OF ASSEMBLY

TECHNICAL FIELD

The present invention relates generally to a sealed joint and, more particularly, to a sealed joint between two telescopically assembled elements.

BACKGROUND ART

In gas turbine engines, such as disclosed in PCT International Publication WO No. 82/01033 by Karstensen published on Apr. 1, 1982 and also U.S. Pat. No. 4,030,288 issued to Davis et al on June 21, 1977, it has been conventional to provide one or more radially-resilient seals between a stator nozzle assembly and a surrounding housing which are telescopically assembled together. Such seals serve to seal an auxiliary cooling air stream, used to internally cool the stator nozzle vanes and perhaps other various high temperature portions of the gas turbine engine, from a much hotter main combustion gas stream used to propel the blades of a rotatable turbine rotor assembly.

Such seals must be radially resilient to accommodate differential thermal growth, as well as dimensional tolerances, between the overlapping housing and the relatively hotter stator nozzle assembly. For example, as shown in U.S. Pat. No. 4,268,046 issued to Nisper on May 19, 1981, each seal may comprise a plurality of axially stacked split-ring segments and a resilient annular expander. The expander is disposed radially inside all the split-ring segments in order to resiliently expand them radially outwardly against the housing.

One problem with the above arrangements is that the radially expandable seal frequently tends to completely spring out of its annular groove before or during telescopic assembly of the stator nozzle assembly and the overlapping housing. Furthermore, such telescopic assembly is a blind one in the sense that the seal becomes hidden from the assembler's view once the housing and the stator nozzle assembly are overlapped. Consequently, the assembler cannot see whether or not the seal has remained in its annular groove and is properly seated against the overlapping housing.

Improper installation of the seal can lead to a number of problems during gas turbine engine operation. First, the pressurized cooling air stream will leak past the unseated seal and will flow directly into the hot combustion gas stream at some angle that would cause undesirable turbulence and disruption of the relatively smooth flow lines of the hot combustion gas stream. Such disruption decreases the momentum of the hot combustion gas stream and consequently lowers the power output of the turbine rotor assembly. Second, the leakage of cooling air from its intended flow path starves the relatively thin-walled nozzle vanes and other internally air cooled portions of the gas turbine engine of their required cooling air. Such starvation of cooling air permits rapid oxidation and thermal failure of those components exposed to extremely high temperatures. Third, since the cooling air is normally bled from a compressor portion of the gas turbine engine, the leakage of cooling air past the aforementioned seal represents a waste of work done on that cooling air by the compressor portion. Unfortunately, the existence of such an improperly installed seal is usually diagnosed, if at all, only after the gas turbine engine has been fully assembled and operated. Thus, repair of the incorrectly installed seal is usually both time consuming and very costly.

Various methods have been devised to install a radially-resilient seal between two telescopically assembled elements. For example, prior to the installation of a piston and piston ring subassembly into a combustion cylinder of a reciprocating internal combustion engine, it has been conventional to temporarily place an annular piston ring compressor in stationary coaxially abutting relationship against an open end of the combustion cylinder. One known annular piston ring compressor is a one-piece sleeve having a tapered inside wall through which the piston and piston ring subassembly is slidably inserted into the combustion cylinder.

However, once the piston and piston ring subassembly is installed in the combustion cylinder, this piston ring compressor performs no other function and must be removed from the engine to permit further assembly of the engine. Furthermore, this piston ring compressor is not usable for other types of telescopic assemblies, for instance those found in the above described gas turbine engines, where the telescopic assembly of a piston ring carrier and an overlapping housing occurs within a substantially imperforate outer casing. Such a configuration having an outer casing already in place not only obstructs the assembler's view of the telescopic assembly but also completely obstructs the assembler's access to that internal region for insertion and removal of a typical piston ring compressor.

Another typical problem with gas turbine engines is successfully minimizing the amount of heat transferred during operation from the relatively hot stator nozzle assembly to the outer casing of the gas turbine engine. Minimizing such heat transfer harnesses more usable energy for driving the turbine rotor assembly and also keeps the outside surface temperature of the outer casing from becoming unacceptably high. As shown in U.S. Pat. No. 4,166,878 issued to Thompson et al on Sept. 4, 1979 and U.S. Pat. No. 3,864,056 issued to Gabriel et al on Feb. 4, 1975, it has been conventional to provide an annular heat shield which is disposed within the outer casing to prevent transfer of heat that is radiated outwardly from components directly exposed to the hot combustion gas stream.

The present invention is directed to overcoming one or more of the problems as set forth above.

DISCLOSURE OF THE INVENTION

In one aspect of the present invention a sealed joint is disclosed having a housing including a longitudinal axis, a carrier telescopically disposed therein, a radially-resilient annular seal which is disposed in a groove of the carrier and which sealedly contacts the overlapping portion of the housing, and a separate annular member maintained around the carrier and axially spaced from the seal. The annular member has an internal annular surface which is diametrically tapered along the longitudinal axis in decreasing fashion towards the seal. One end portion of the internal annular surface has an enlarged internal diameter which is of a preselected magnitude sufficient to surround both the carrier and the installed seal in radially-spaced relation while the other end portion of the internal annular surface has a reduced internal diameter of another preselected magnitude sufficient to radially-inwardly compress the seal further in the groove.

In another aspect of the present invention a method is disclosed of assembling a sealed joint defined by a carrier telescopically disposed in a housing having a longitudinal axis. The method includes the steps of installing a radially resilient annular seal in a groove of the carrier, moving a separate annular member having a diametrically tapered internal annular surface to a first axial position at which the annular member is generally concentrically spaced around both the carrier and the seal, moving the annular member to a second axial position around the carrier so that the tapered internal surface radially-inwardly compresses the seal further in the groove, telescopically assembling the housing and the carrier together and thereby displacing the annular member with the housing to a third axial position around the carrier at which the annular member is disposed out of contact with the seal thereby leaving the seal free to expand radially outwardly to sealedly contact the overlapping portion of the housing, and maintaining the annular member at the third axial position after telescopic assembly of the carrier and the housing.

The present invention provides a compact sealed joint and fool-proof method of assembly which maintains proper orientation of a radially-resilient seal during telescopic assembly of a carrier and a housing. Moreover, the present invention ensures that the seal will properly seat against a housing inner surface which is not only inaccessible to the assembler but is also hidden from the assembler's view during the telescopic assembly.

BRIEF DESCRIPTION OF THE DRAWINGS

FIG. 2 is a diagrammatic enlarged view of an expander of a sea,l shown in FIG. 1.

FIG. 3 is a side view taken along line III—III of FIG. 2.

FIG. 4 is an enlarged cross-sectional view taken along line IV—IV of FIG. 3.

FIG. 5 is a diagrammatic enlarged view of a split-ring segment of a seal shown in FIG. 1.

FIG. 6 is an enlarged partial view taken generally along circular line VI of FIG. 5.

FIG. 7 is an enlarged cross-sectional view taken along line VII—VII of FIG. 5.

FIG. 8 is a diagrammatic enlarged cross-sectional view of one initial step in the method of assembly of the sealed joint shown in FIG. 1.

FIG. 9 is a diagrammatic enlarged end view of an annular member shown in FIGS. 1 and 8.

FIG. 10 is a cross-sectional view taken along line X—X of FIG. 9.

FIG. 11 is an enlarged partial side view taken along line XI—XI of FIG. 10.

FIG. 12 is a view similar to FIG. 11 but showing an alternative embodiment.

BEST MODE FOR CARRYING OUT THE INVENTION

Figure 1:
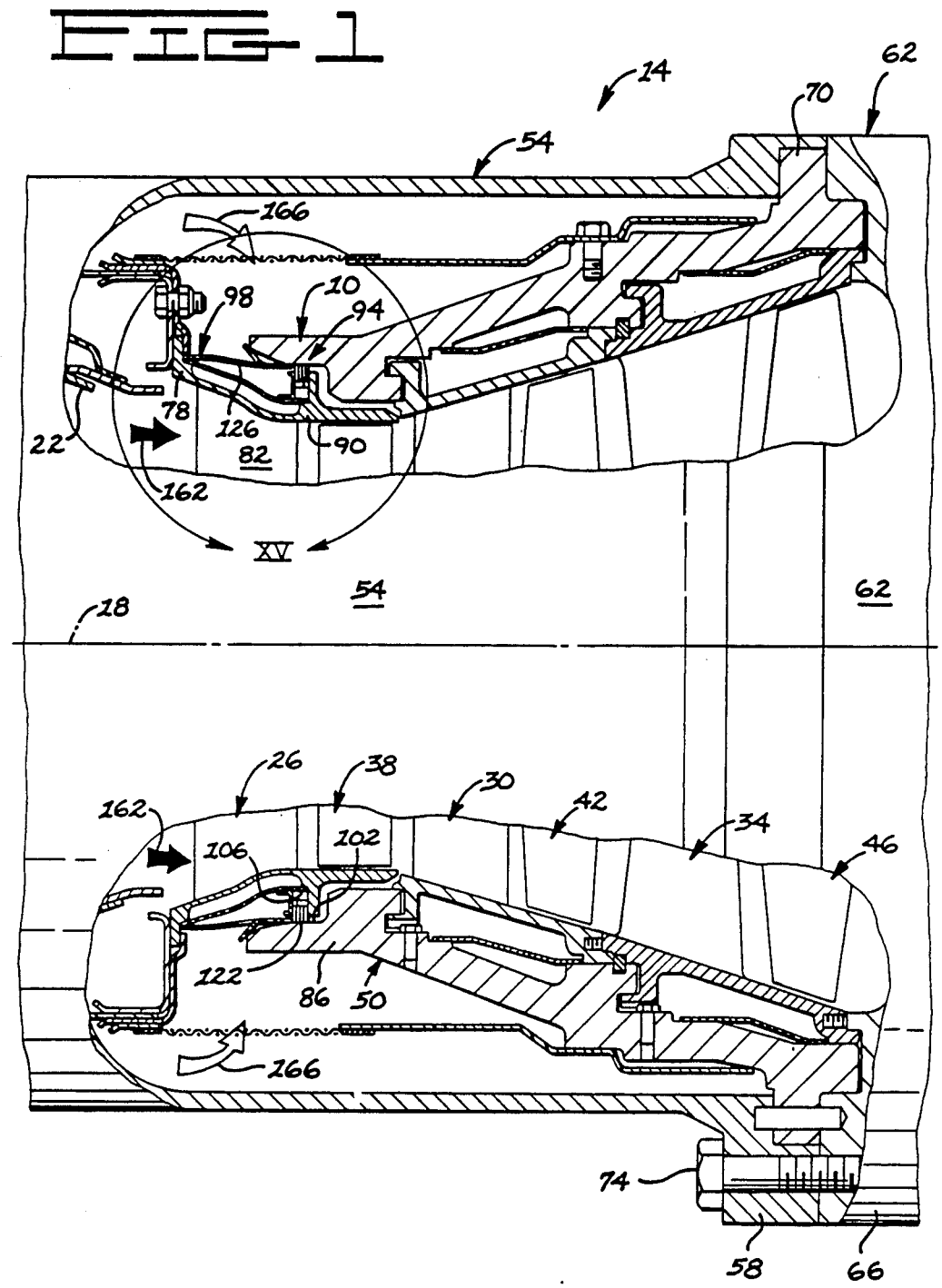
FIG. 1 is a diagrammatic and partially cross-sectional view of an embodiment of the present invention as incorporated in a gas producer section of a gas turbine engine.

Referring to FIGS. 1-15 wherein similar reference numerals designate similar elements or features in all the views, the preferred embodiment of a sealed joint 10 is shown as incorporated in a gasifier section of a gas turbine engine 14. Although the sealed joint and method of assembly is illustrated for use on a gas turbine engine, it should be kept in mind that the invention may also be applicable to many other different types of structures having a pair of telescopically assembled elements which require a sealed joint therebetween.

Referring to FIG. 1, the gas turbine engine 14 has a longitudinal axis 18 and includes generally well-known elements such as a fuel combustor ring 22 (only the outlet portion is visible in FIG. 1), a plurality of axially-spaced stator nozzle assemblies 26,30,34 and a plurality of axially-spaced turbine rotor assemblies 38,42,46, an internally-disposed and frusto-conically shaped support housing 50, an externally-disposed and substantially imperforate combustor casing 54 having a longitudinal open end portion 58, and an externally-disposed exhaust casing 62 having a longitudinal open end portion 66.

As it is well known to those persons skilled in the art, a central portion of the first-stage stator nozzle assembly 26 is connected to and supported by a bearing housing (not shown) that is connected to and supported by the combustor casing 54. The bearing housing also supports a rotatable drive shaft (not shown) which extends coaxially along the longitudinal axis 18. The drive shaft is connected to and supports a central portion of each turbine rotor assembly 38,42,46. The second and third stage stator nozzle assemblies 30,34 are circumferentially supported by the support housing 50. The support housing 50 includes a radially-extending flange 70 that is sandwiched partially between the abutting longitudinal end portions 58,66 of the combustor casing 54 and the exhaust casing 62 which are clamped together by a plurality of circumferentially spaced bolts, one of which is shown at 74.

As shown in FIG. 8, the first-stage stator nozzle assembly 26 includes an annular stator nozzle carrier 78 and a plurality of radially-extending hollow nozzle vanes, one of which is shown at 82, supported by the stator nozzle carrier 78.

Figure 15:
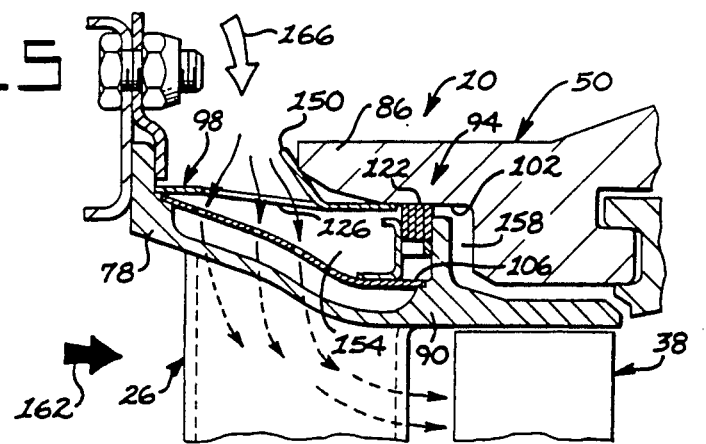
FIG. 15 is an enlarged view taken generally along circular line XV of FIG. 1.

The sealed joint 10 is unconventional and, as shown in FIGS. 1 and 15, comprises a generally hollow longitudinal end portion 86 of the support housing 50, a generally complementary longitudinal end portion 90 of the stator nozzle carrier 78 telescopically disposed in the end portion 86 of the support housing 50, a radially-resilient annular seal 94, and a separate annular member 98. The end portion 86 of the support housing 50 includes an inner cylindrical surface 102 and the end portion 90 of the stator nozzle carrier 78 defines an annular groove 106 which opens radially-outwardly towards and directly faces the inner cylindrical surface 102 of the support housing 50.

The annular seal 94 by itself is conventional and, as shown in FIGS. 2-7, preferably includes multiple pieces such as an equalizer expander 110, a connecting pin 114, and at least one and preferably a plurality of axially stacked split-ring segments 118 which surround the equalizer expander 110. Each of the split-ring segments 118 has a radial peripheral surface 122 which sealedly contacts the inner cylindrical surface 102 of the support housing 50. Such a seal is more fully described in the aforementioned U.S. Pat. No. 4,268,046. Alternatively, other types of annular seals may be used instead of the multiple piece seal 94 herein illustrated provided those other seals are radially-resilient to accommodate dimensional tolerances and differential thermal growth between the stator nozzle carrier 78 and the overlapping support housing 50.

The annular member 98 is preferably a single-piece heat shield made of sheet metal such as stainless steel. As shown in FIGS. 1 and 15, the annular member 98 is maintained concentrically around the stator nozzle carrier 78 and is axially spaced from the radial peripheral surface 122 of the annular seal 94. As shown in FIG. 8, the annular member 98 has an internal annular surface 126 including a pair of cylindrical opposite end portions 130,134 and a tapered intermediate portion 138 therebetween. As shown in FIG. 10, one end portion 130 of the internal annular surface 126 has an enlarged internal diameter D1 which is of a preselected constant magnitude to surround both the stator nozzle carrier 78 and the installed seal 94 in radially spaced relation. The other end portion 134 of the internal annular surface 126 has a reduced internal diameter D2 of another preselected constant magnitude sufficient to radially-inwardly compress the seal 94 further in the annular groove 106. As shown in FIGS. 1 and 15, the tapered intermediate portion 138 of the internal annular surface 126 is diametrically tapered coaxially along the longitudinal axis 18 in decreasing fashion towards the annular seal 94.

As shown in FIGS. 9-11, the annular member 98 includes at least one and preferably a plurality of radially-opening and circumferentially-spaced apertures 142,146 defined through the periphery of the annular member. Furthermore, the annular member 98 includes at least one and preferably a plurality of planar projections 150 which are connected to and extend radially outwardly from the periphery of the annular member 98. As shown in FIG. 11, at least one of the projections 150 and at least one of the apertures 142 are preferably arranged as a directly adjacent pair which are conjunctionally formed by partially shearing a radial peripheral portion of the annular member 98 to form a rectangular tab which is then bent radially outwardly to completely expose a generally rectangular aperture 142. As shown in FIGS. 9-11, all the planar projections 150 are equally spaced from one another and all lie in a common plane that is perpendicular to the longitudinal axis 18. Alternatively, as shown in FIG. 12, more rigidity against an axial force can be provided by orienting the planar projections 150' so that they lie in various radial planes containing the longitudinal axis 18. Other configurations for the projection 150 are also possible provided they adequately serve as a means for directly or remotely gripping the annular member 98 for axial movement to be described hereafter.

As shown in FIG. 15, the nozzle carrier 78, the annular member 98, and the annular seal 94 cooperatively define a first annular plenum 154. The first plenum 154 is sealedly separated by the seal 94 from an adjacent second annular plenum 158. The second plenum 158 is located axially downstream of the first plenum 154 and is partially defined by the annular seal 94, the support housing end portion 86, and the end portion 90 of the stator nozzle carrier 78.

Method of Assembly

Referring to FIG. 1, the gas producer section of the gas turbine engine 14 is first built up to the point where the bearing housing (not shown) and the drive shaft (not shown) are assembled to the combustor casing 54. For ease of assembly, the combustor casing 54 is oriented relative to the ground and gravitational force so that the longitudinal axis 18 extends vertically and so that the open end portion 58 of the combustor casing 54 faces vertically upward. Also the stator nozzle assemblies 26,30,34 and the turbine rotor assemblies 38,42,46 are each built up as subassemblies outside of the combustor casing 54.

As shown in FIG. 8, the next step is installing the equalizer expander 110 and then the split-ring segments 118 in the groove 106 of the stator nozzle carrier 78 which is still outside of the combustor casing 54 and oriented so that its end portion 90 faces vertically upward. The next step is moving the annular member 98 (leftwardly according to FIG. 8) to a first axial position around the stator nozzle carrier 78 at which the annular member 98 is generally concentrically spaced around both the stator nozzle carrier 78 and the annular seal 94. The annular member 98 is oriented so that, at the first axial position, the tapered intermediate portion 138 of the internal annular surface 126 is diametrically tapered along the longitudinal axis 18 in decreasing fashion away from the annular seal 94.

Figure 13:
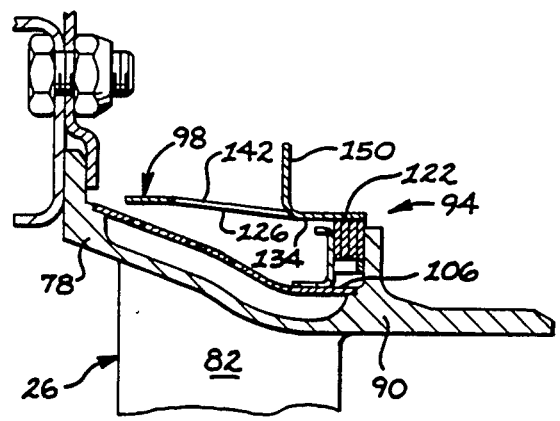
FIG. 13 is a view similar to FIG. 8 but showing another sequential step in the method of assembly of the sealed joint shown in FIG. 1.

As shown in FIG. 13, the next step is moving the annular member 98 to a second axial position around the stator nozzle carrier 78 so that the tapered internal surface 126 directly contacts the radial peripheral surface 122 and radially-inwardly compresses the annular seal 94 gradually further in the groove 106. While the annular member 98 is moved from the first to the second axial position, the position of the installed annular seal 94 can be inspected from both the completely exposed circumferential (rightward according to FIG. 8) side of the groove 106 as well as through one or more of the apertures 142,146 of the annular member 98 which, at the second axial position, are located adjacent the other circumferential (leftward according to FIG. 8) side of the groove 106. Such inspection may include visually inspecting through one or more of the apertures 142,146 or manually probing through one or more of the apertures to determine whether or not the annular seal 94 has remained in the groove 106 and also whether or not the radial peripheral surface 122 of the annular seal 94 is properly seated against the internal annular surface 126 of the annular member 98.

The next step is vertically lowering the first-stage stator nozzle assembly 26 into the open end portion 58 of the otherwise substantially imperforate combustor casing 54 and connecting the central portion of the first-stage stator nozzle assembly 26 to the bearing housing (not shown).

Figure 14:
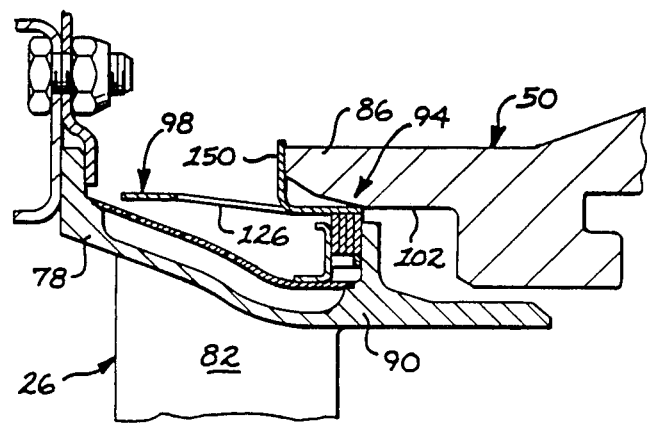
FIG. 14 is a view similar to FIG. 13 but showing another sequential step in the method of assembly of the sealed joint shown in FIG. 1.

As shown in FIG. 14, the next step is vertically lowering the support housing 50 into the open end portion 58 of the combustor casing 54 and telescopically assembling the support housing 50 and the stator nozzle carrier 78 together. During this telescopic assembly, the support housing 50 simultaneously contacts and pushes upon all the planar projections 150 thereby displacing the annular member 98 to a third axial position around the stator nozzle carrier 78. At the third axial position, shown in FIG. 15, the annular member 98 is completely disposed out of direct contact with the radial peripheral surface 122 of the annular seal 94. The third axial position of the annular member 98 leaves the radial peripheral surface 122 of the annular seal 94 free to expand radially outwardly to sealedly contact the inner cylindrical surface 102 of the support housing 50. The next step is fixedly maintaining the annular member 98 at the third axial position after telescopic assembly of the support housing 50 and the stator nozzle carrier 78. As shown in FIG. 15, the annular member 98 is axially trapped between an annular shoulder formed on the stator nozzle carrier 78 and the end portion 86 of the support housing 50 which contacts the planar projections 150. As shown in FIGS. 1 and 15, once the annular member 98 abuts the annular shoulder of the stator nozzle carrier 78, the planar projections 150,150' are permitted, if necessary, to accommodate axial tolerances by slightly bending under the axial force of the support housing end portion 86. Such bendability of the projections 150,150' ensures that the support housing 50 will completely seat against the open end portion 58 of the combustor casing 54.

Thereafter the first-stage turbine rotor assembly 38, the second-stage stator nozzle assembly 30, the second-stage turbine rotor assembly 42, the third-stage stator nozzle assembly 34, and the third-stage turbine rotor assembly 46 are successively lowered into place in the combustor casing 54. The end portion 66 of the exhaust casing 62 is then placed against both the support housing 50 and the end portion 58 of the combustor casing 54 and clamped thereto by installing the plurality of bolts 74.

Industrial Applicability

While the operation of the present invention in a gas turbine engine 14 is believed to be clearly apparent from the foregoing description, further amplification will be made in the following brief summary of such operation which is illustrated in FIGS. 1 and 15.

During operation, fuel is ignited in the combustor ring 22 and forms a relatively hot combustion gas stream 162 flowing generally axially which continuously enters the first-stage stator nozzle assembly 26 at a temperature of, for example, about 982° to about 1093° C. (1800° to 2000° F.). The hot combustion gas stream 162 then flows sequentially through the various axial stages (26,38,30,42,34,46) of the gasifier section where the energy of the hot combustion gas stream is progressively extracted and harnessed into rotational power.

Oxidation and thermal failure of the first-stage nozzle vanes 82 and other high temperature components of the gasifier section is prevented by continuously providing a cooling air stream 166 bled from a compressor section (not shown) of the gas turbine engine 14. Some of the cooling air stream 166, for example at a temperature of about 354° to about 388° C. (670° to 730° F.), is communicated radially-inwardly through the apertures (142,146) of the annular member 98, the first plenum 154, a radially-outward open end of each first-stage nozzle vane 82, and eventually exits through a plurality of openings formed in the trailing or downstream edge of each first-stage nozzle vane 82. The cooling air stream 166 is then communicated directly to the hot combustion gas stream 162 at a zero or substantially zero angle thereto which does not appreciably lessen the momentum of the hot combustion gas stream.

The fool-proof sealed joint 10, including the correctly seated seal 94, positively ensures that the cooling air stream 166 does not leak directly from the first annular plenum 154 to the second annular plenum 158 which directly communicates with the hot combustion gas stream 162 at a location between the first-stage turbine rotor assembly 38 and the second-stage stator nozzle assembly 30. Such prevention of cooling air leakage not only conserves the cooling air stream and work done on it by the compressor section, but also prevents the cooling air stream from adversely disturbing the momentum of the hot combustion gas stream thereby preventing loss of power output by the gas turbine engine 14.

The seal 94 maintains a pressure differential of, for example, about 138 kPa (20 psi) between the first plenum 154 and the relatively lower pressure second plenum 158 which enhances the sealing in the axial direction (rightward according to FIGS. 1 and 15) between the plurality of split-ring segments 118 of the seal 94 and the annular groove 106 of the stator nozzle carrier 78.

Compactness of design is augmented in the gas turbine engine 14 by the annular member 98 which performs the dual function of not only ensuring proper installation of the radially-resilient seal 94 but also serving as a heat shield for the combustor casing 54. During operation, the imperforate portions of the annular member 98 reflect back heat that is radiated radially outwardly by the first-stage nozzle vanes 82. Such minimization of heat transfer by the annular member 98 reduces the outer surface temperature of the combustor casing 54 by, for example, about 16° to about 27° C. (60° to 80° F.).

Other aspects, objects, and advantages of this invention can be obtained from a study of the drawings, the disclosure and the appended claims.

We claim:

1. A method of assembling a sealed joint defined by a carrier telescopically disposed in a housing, said housing having an inner cylindrical surface and a longitudinal axis, said carrier defining an annular groove opening towards the inner cylindrical surface of the housing, said method comprising the steps of:

installing in the groove a radially-resilient annular seal having a radial peripheral surface;

moving a separate annular member to a first axial position at which the annular member is generally concentrically spaced around both the carrier and the seal, said annular member having an internal annular surface which at the first axial position is diametrically tapered along the longitudinal axis in decreasing fashion away from the seal;

moving the annular member to a second axial position around the carrier so that the tapered internal surface of the annular member directly contacts the radial peripheral surface of the seal and thereby radially-inwardly compresses the seal further in the groove;

telescopically assembling the housing and the carrier together and thereby displacing the annular member with the housing to a third axial position around the carrier at which the annular member is disposed out of direct contact with the radial peripheral surface of the seal thereby leaving the radial peripheral surface of the seal free to expand radially outwardly to sealedly contact the inner cylindrical surface of the housing; and maintaining the annular member at the third axial position after telescopic assembly of the housing and the carrier.

2. The method of claim 1 including the additional intermediate step, while the annular member is at the second axial position around the carrier, of inspecting the position of the installed seal through at least one radial peripheral aperture defined through the annular member, said inspection step verifying that the seal remains in the groove and that the radial peripheral surface of the seal is properly seated against the internal annular surface of the annular member.

3. The method of claim 2 wherein the inspection step includes visually inspecting through the aperture to determine the position of the installed seal while the annular member is at the second axial position around the carrier.

4. The method of claim 2 wherein the inspection step includes manually probing through the aperture to determine the position of the installed seal while the annular member is at the second axial position around the carrier.

5. The method of claim 1 wherein the step of displacing the annular member to the third axial position around the carrier includes the intermediate step of contacting and axially pushing with the housing upon at least one projection connected to and extending radially-outwardly from the annular member.

6. A method of assembling a sealed joint defined by a generally hollow end portion of a housing telescopically disposed over a generally complementary end portion of a stator nozzle carrier of a gas turbine engine, said end portion of the housing having an inner cylindrical surface and a longitudinal axis, said end portion of the stator nozzle carrier defining an annular groove radially-outwardly opening towards the inner cylindrical surface of the housing, said method comprising the sequential steps of:

installing in the groove a radially-resilient annular seal having a radial peripheral surface;

moving a separate annular member to a first axial position at which the annular member is generally concentrically spaced around both the stator nozzle carrier and the seal, said annular member having an internal annular surface which at the first axial position is diametrically tapered along the longitudinal axis in decreasing fashion away from the seal;

moving the annular member to a second axial position around the stator nozzle carrier so that the tapered internal surface of the annular member directly contacts the radial peripheral surface of the seal and thereby radially-inwardly compresses the seal further in the groove;

telescopically assembling the housing and the stator nozzle carrier together and thereby displacing the annular member with the housing to a third axial position around the stator nozzle carrier at which the annular member is disposed out of direct contact with the radial peripheral surface of the seal thereby leaving the radial peripheral surface of the seal free to expand radially outwardly to sealedly contact the inner cylindrical surface of the housing; and fixedly maintaining the annular member at the third axial position after telescopic assembly of the housing and the stator nozzle carrier.

7. The method of claim 6 including the additional intermediate step, while the annular member is at the second axial position around the stator nozzle carrier, of inspecting the position of the installed seal through at least one radial peripheral aperture defined through the annular member, said inspection step verifying that the seal remains in the groove and that the radial peripheral surface of the seal is properly seated against the internal annular surface of the annular member.

8. The method of claim 7 wherein the inspection step includes visually inspecting through the aperture to determine the position of the installed seal while the annular member is at the second axial position around the stator nozzle carrier.

9. The method of claim 7 wherein the inspection step includes manually probing through the aperture to determine the position of the installed seal while the annular member is at the second axial position around the stator nozzle carrier.

10. The method of claim 6 wherein the step of displacing the annular member to the third axial position around the stator nozzle carrier includes the intermediate step of contacting and pushing with the housing upon at least one projection connected to and extending radially outwardly from the annular member.

11. The method of claim 6 wherein the annular member is a heat shield arranged during gas turbine engine operation to minimize the radially-outward transfer of heat emanating from the stator nozzle carrier.

* * * * *